Figure 1:

UNITED STATES PATENT OFFICE.

SIEGFRIED CZAPSKI, OF JENA, GERMANY, ASSIGNOR TO THE FIRM OF CARL ZEISS, OF JENA, GERMANY.

OPTICAL INSTRUMENT.

No. 807,728.      Specification of Letters Patent.      Patented Dec. 19, 1905.

Application filed August 1, 1905. Serial No. 272,196.

*To all whom it may concern:*

Be it known that I, SIEGFRIED CZAPSKI, doctor of philosophy, a citizen of the German Empire, residing at Carl Zeiss strasse, Jena, in the Grand Duchy of Saxe-Weimar, Germany, have invented a new and useful Optical Instrument for the Pair of Eyes, of which the following is a specification.

The invention consists in an instrument for making observations and measurements which relate to the pair of eyes.

The main object is to engage the patient to look straight ahead with both eyes with passive accommodation. For this purpose it has been hitherto requisite that the examiner should abandon his natural and most favorable place in front of the patient in order to allow the latter to look in a straight line at a distant object. In the new instrument this object is replaced for each eye singly by the distant virtual image of a mark which is only a little way removed from the patient's eye, so that it does not obstruct the examiner during the observation. A collective lens arranged in the focal distance behind the mark, therefore between the mark and the patient's eye, generates the image. It is not necessary that the mark should lie in the focus. It can be arranged vertically above or below the focus. In all these cases the rays of that pencil which issues from the middle point of the mark are after the passage through the lens parallel to one another and to the vertical axial plane, leaving the spherical aberration out of the question. When the patient's eye behind the lens is directed toward the middle point of the mark, the visual line coincides with one of the parallel rays. For that reason when the vertical axial plane is parallel to the median plane of the patient's head the eye fixing the middle point of the mark-image is also directed straight ahead no matter what part of the pencil of parallel rays corresponding to this point the pupil of the eye receives. If two identical systems of this description be united with parallel axes and presented to the patient so that he can see with each eye the corresponding mark-image, then when he fixes the mark-images the visual lines of both eyes are parallel to each other whether the distance between the eyes be equal to the distance between the lenses or no. They are also parallel to the median plane of the head if the lens-axes are parallel to this plane. In order that the patient may only see one mark with each eye, the fields of both lenses must be separated, for instance, by a diaphragm between the two systems. The marks harmonize in size, form, and position, so that the patient only sees one mark whenever he fixes with each eye the corresponding mark-image.

For many patients it is difficult to fix both eyes simultaneously on different objects, so that the examiner may find it convenient to engage the patient to fix successively the right and the left mark. To prevent the patient from confusing right and left, a shutter can be arranged for each lens. Thereby the examiner is enabled to make the corresponding mark-image invisible to the patient's eye which is not under observation, so that the patient without troubling about right and left may correctly fix with the observed eye.

The effect of the instrument may be extended by covering the lenses as little as possible with the holder of the marks. Then the examiner is able to observe the patient's eyes by means of the lenses as magnifying-glasses, the left eye with his right and the right with his left eye. In this case it is desirable to construct the mark-holder as a shade, and thus obscure the examiner's face, which otherwise the patient would see through the lenses, so that it might detract his attention from the marks.

Comparative observations of both eyes would be most conveniently made if the examiner could look at the patient's eyes close one above the other. In general he sees them close beside one another, and the closer together up to coincidence the more their images produced by the lenses are distant, because the convergence of his eyes corresponds to the distance at which the observant eye is accommodated. That position one above the other can be realized by inserting in the one or the other system, or in each, a prism of small refracting angle between the lens and the examiner's eye. The direction of a principal section of such a prism depends upon the original position of the images to be located one above the other.

In order to replace the simple observations by measurements—for instance, by measurements of the cornea-diameter, of the pupil-diameter, or of the interocular distance—i. e., the distance between the eyes pointed in parallel directions—appropriate scales may be arranged behind the lenses and as near as possible to the patient's eyes. An instrument so completed gives in the interocular distance directly the distance requisite for the lenses of spectacles for distant vision. The lens distance of glasses for reading must be nine per cent. less. In order to get this distance directly by measurement instead of having to reckon it or to take it from a table on the basis of the measured interocular distance, the division of the distance-scale should be made by nine ninety-firsts too large, so that the reading gives ninety-one per cent. of the true distance, and therefore the right measure for reading-spectacles.

Figure 2:
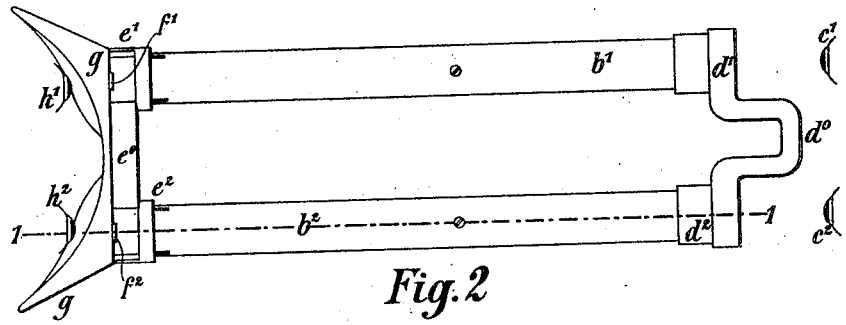
Figure 3:
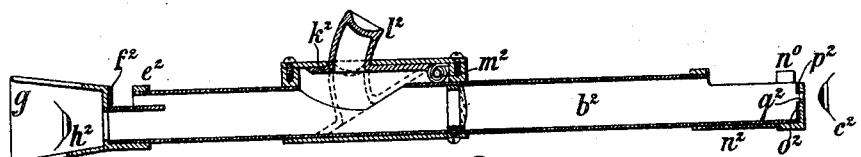
Figure 4:
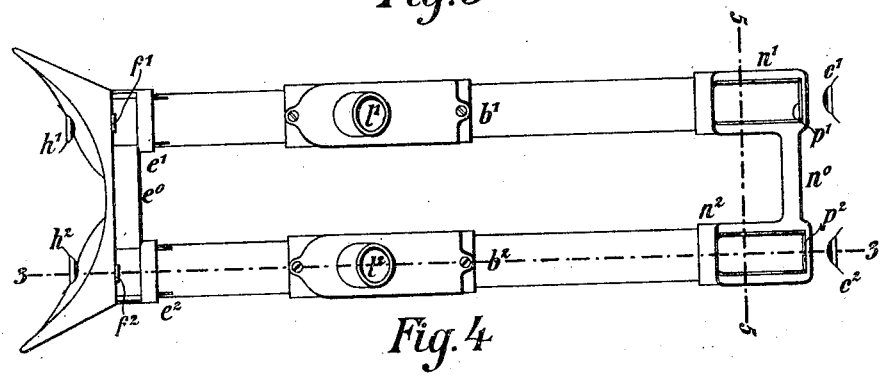
Figure 5:
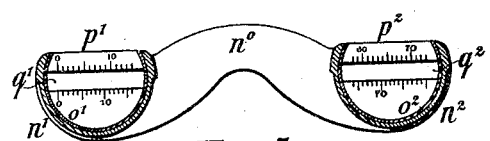

In the accompanying drawings, Figure 1 is a sectional side view of an instrument for comparative observation of both eyes, the section being taken on the line 1 1 in Fig. 2. Fig. 2 is the plan view of the same instrument. Fig. 3 is a sectional side view of an instrument for measuring the interocular distance and for determining the distance between the lenses of reading-spectacles, the section being taken on the line 3 3 in Fig. 4. Fig. 4 is the plan of the instrument the side view of which is shown in Fig. 3. Fig. 5 is a section on the line 5 5 in Fig. 4.

Referring to Figs. 1 and 2 of two collective lenses, one, $a^2$, is shown in Fig. 1 to be fitted in the tube $b^2$, and the other, not visible in the drawings, but hereinafter referred to as $a'$, is fitted at the corresponding point in the tube $b'$. This pair of tubes $b'$ $b^2$ serves to separate the fields of the lenses and is connected at that end intended to be presented to the eyes $c'$ $c^2$ of the patient by a tie $d'$ $d^0$ $d^2$. The middle part $d^0$, cranked twice, is at the same time, as intimated in Fig. 1, arched, so that it can ride securely upon the bridge of the nose. The other ends of the two tubes are fastened to the carrier $e'$ $e^0$ $e^2$ of the marks $f'$ $f^2$, the carrier and the shade $g$ being made in one piece. In the example chosen the eyes $c'$ $c^2$ of the patient, as well as the marks $f'$ $f^2$, are situated at focal distance from the lenses $a'$ $a^2$. For this reason the examiner must direct his own eyes $h'$ $h^2$ straight ahead in the observation of the one and the other of the distant virtual images of the eyes $c'$ $c^2$—that is, the images of the eyes would appear to him superimposed. This is prevented by the prism $i$ in the tube $b^2$ locating the image of the eye $c^2$ over that of $c'$.

In the instrument according to Figs. 3 to 5, which is intended to serve as an interocular distance-gage, the prism $i$ is omitted. Each tube, however, is provided with a lens-shutter whereby the examiner can cause the image of the eye not under observation to disappear, making at the same time the mark corresponding thereto invisible to the patient. Each shutter consists, essentially, of a flap $k'$ $k^2$, fitted with finger-studs $l$ $l^2$. A spring $m'$ $m^2$ wound round the hinge keeps the flap in the position shown by the heavy lines, the tube being thus unobstructed. In this case also are the ends of the tubes presented toward the patient connected by a tie $n'$ $n^0$ $n^2$. Here the tie is not cranked, so that the parts $n'$ $n^2$ lie in the plane of the bridge $n^0$. The tie carries on both sides the scales of measurement $o'$ $o^2$ and $p'$ $p^2$. (Shown in Fig. 5 on a larger scale.) These scales are separated by a slit $q'$ $q^2$ to enable the patient to see the marks $f'$ $f^2$ and simultaneously the examiner the pupils of the eyes of the patient. The arrangement of the scales in the example shown is such that the difference in the position of the right and left pupil relatively to the lower scale $o'$ $o^2$ supplies the interocular distance, this being also the necessary distance between the lenses for long-distance spectacles, while the difference of the reading on the upper scale $p'$ $p^2$ yields the distance between the lenses of reading-spectacles.

What I claim as my invention, and desire to secure by Letters Patent, is—

1. The combination, with two collective lenses arranged at an average interocular distance and having the axes parallel and the fields separate, of a frame connecting both lenses and provided with two marks in the focal plane behind the lenses and also at interocular distance.

2. The combination, with two collective lenses arranged at an average interocular distance and having the axes parallel and the fields separate, of a frame connecting both lenses and carrying two shutters, one for each lens, and provided with two marks in the focal plane behind the lenses and also at interocular distance.

3. The combination, with two collective lenses arranged at an average interocular distance and having the axes parallel and the fields separate, of a frame connecting both lenses and carrying two shutters, one for each lens, and provided with two marks at interocular distance in the focal plane behind the lenses, and with two measuring-scales for the eyes to be examined, arranged before the lenses.

4. The combination, with two collective lenses arranged at an average interocular distance and having the axes parallel and the fields separate, of a frame connecting both lenses and carrying two shutters, one for each lens, and provided with two marks behind the lenses in their focal plane and also at interocular distance, and with a measuring-scale made in two parts and arranged in front of the lenses, the division of the scale being too large, so that the false measure read off for the interocular distance is the correct measure for the distance between the lenses of reading-spectacles.

In testimony whereof I have signed my name to this specification in the presence of two subscribing witnesses.

SIEGFRIED CZAPSKI.

Witnesses:
PAUL KRÜGER,
FRITZ SANDER.